United States Patent
Wagner et al.

(10) Patent No.: US 9,764,667 B2
(45) Date of Patent: Sep. 19, 2017

(54) FOLDABLE HEADREST WITH DOUBLE HINGE

(71) Applicant: Ford Global Technologies, LLC, Dearborn, MA (US)

(72) Inventors: Uwe Wagner, Wermelskirchen (DE); Carsten Schauf, Nordrhein-Westfalen (DE); Daniel Hari, Cologne (DE); Kilian Vas, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/827,585

(22) Filed: Aug. 17, 2015

(65) Prior Publication Data

US 2016/0046217 A1 Feb. 18, 2016

(30) Foreign Application Priority Data

Aug. 18, 2014 (DE) .................. 10 2014 216 322

(51) Int. Cl.
*B60N 2/48* (2006.01)

(52) U.S. Cl.
CPC .......... *B60N 2/487* (2013.01); *B60N 2/4808* (2013.01); *B60N 2/4841* (2013.01); *B60N 2/4855* (2013.01); *B60N 2/4858* (2013.01); *B60N 2/4873* (2013.01); *B60N 2/4879* (2013.01); *B60N 2002/4891* (2013.01)

(58) Field of Classification Search
CPC ..... B60N 2/487; B60N 2/4873; B60N 2/4858
USPC .......................... 297/391, 399, 403, 408, 410
See application file for complete search history.

(56) References Cited

U.S. PATENT DOCUMENTS

| | | | | |
|---|---|---|---|---|
| 315,540 A | * | 4/1885 | Patterson | B60N 2/487 297/403 |
| 328,337 A | * | 10/1885 | Patterson | B60N 2/487 297/403 |
| 568,710 A | * | 9/1896 | Williams | B60N 2/487 297/403 |
| 569,078 A | * | 10/1896 | Barker | B60N 2/487 297/403 |
| 1,888,160 A | * | 11/1932 | Craven | A47C 1/10 297/403 |
| 3,065,029 A | * | 11/1962 | Spound | A47C 1/036 297/391 |

(Continued)

FOREIGN PATENT DOCUMENTS

DE 3615857 11/1986
DE 19739798 3/1998

(Continued)

*Primary Examiner* — Beth Stephan
(74) *Attorney, Agent, or Firm* — Vichit Chea; Price Heneveld LLP

(57) ABSTRACT

A headrest for a vehicle seat includes a padded part, carrying bars for securing the padded part to a backrest of the vehicle seat, and a mechanism for turning down the padded part about two swivel axes and from an in-use position into an out-of-use position. The mechanism comprises a cross member connecting the carrying bars to one another and forming the swivel axis of the padded part. Furthermore, the carrying bars and also the cross member run outside the padded part and the padded part is suspended on the cross member from the outside in a swiveling movable manner via the retaining strut and the double clip.

15 Claims, 5 Drawing Sheets

(56) References Cited

U.S. PATENT DOCUMENTS

| | | | | |
|---|---|---|---|---|
| 3,948,562 A * | 4/1976 | Grabner | ............... | B60N 2/4838 |
| | | | | 297/408 |
| 4,576,411 A * | 3/1986 | Kitamura | ................ | B60N 2/38 |
| | | | | 16/332 |
| 5,177,823 A * | 1/1993 | Riach | ....................... | A47C 7/38 |
| | | | | 297/408 |
| 5,316,372 A * | 5/1994 | Amner | ................ | B29C 44/1233 |
| | | | | 297/391 |
| 5,906,414 A * | 5/1999 | Rus | ..................... | B60N 2/4855 |
| | | | | 297/220 |
| 6,113,192 A * | 9/2000 | Schneider | ............. | B60N 2/487 |
| | | | | 297/403 |
| 6,857,704 B2 * | 2/2005 | Stenzel | .................... | A47C 7/38 |
| | | | | 297/408 |
| 7,413,253 B2 * | 8/2008 | Karlberg | .............. | B60N 2/4844 |
| | | | | 297/391 |
| 7,494,188 B1 * | 2/2009 | Lin | ........................ | A47C 7/383 |
| | | | | 297/397 |
| 7,832,803 B2 * | 11/2010 | Cassaday | ................. | A47C 7/38 |
| | | | | 297/391 |
| 8,322,790 B2 * | 12/2012 | Tscherbner | .......... | B60N 2/4832 |
| | | | | 297/220 |
| 8,876,210 B2 * | 11/2014 | Magstadt | ............. | A61G 15/125 |
| | | | | 297/408 |
| 8,955,913 B2 * | 2/2015 | Veine | ................... | B60N 2/4814 |
| | | | | 297/404 |
| 9,380,878 B1 * | 7/2016 | Chen | ......................... | A47C 7/38 |
| 2009/0200851 A1 * | 8/2009 | Link | ........................ | A47C 7/38 |
| | | | | 297/409 |
| 2012/0280547 A1 * | 11/2012 | Veine | ................... | B60N 2/4814 |
| | | | | 297/354.1 |

FOREIGN PATENT DOCUMENTS

| | | | |
|---|---|---|---|
| DE | 10038813 | 2/2002 | |
| FR | 2962949 | 1/2012 | |
| GB | 2132479 A * | 7/1984 | ........... B60N 2/4855 |

* cited by examiner

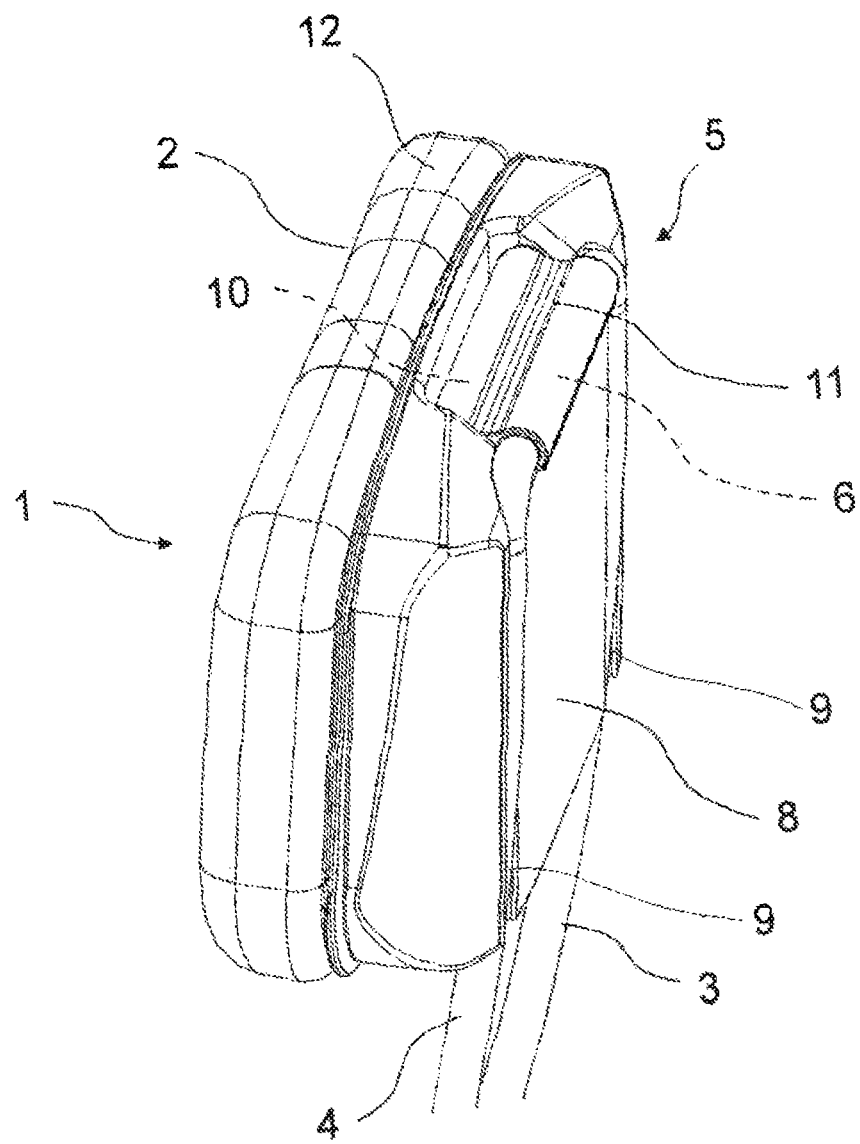

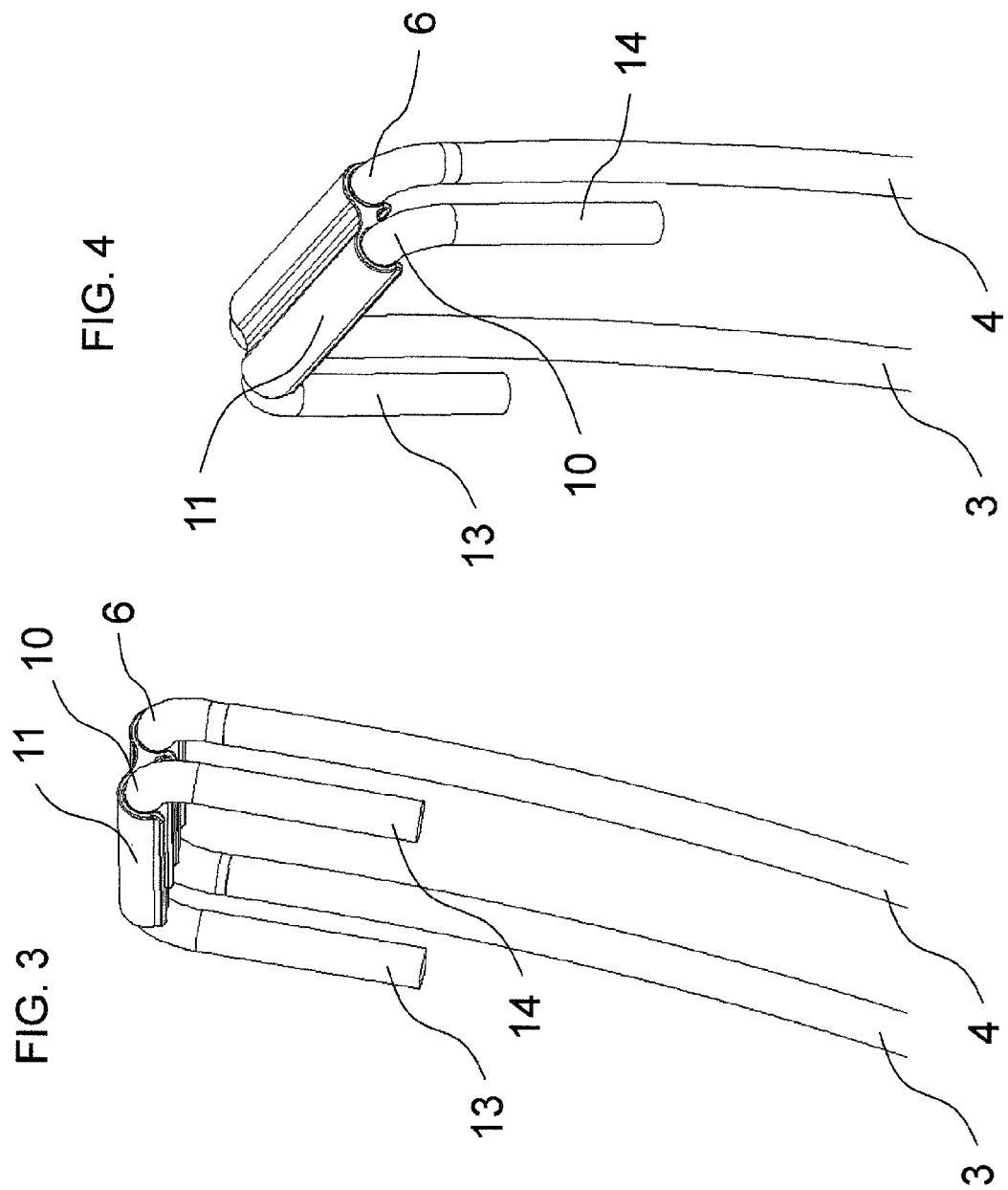

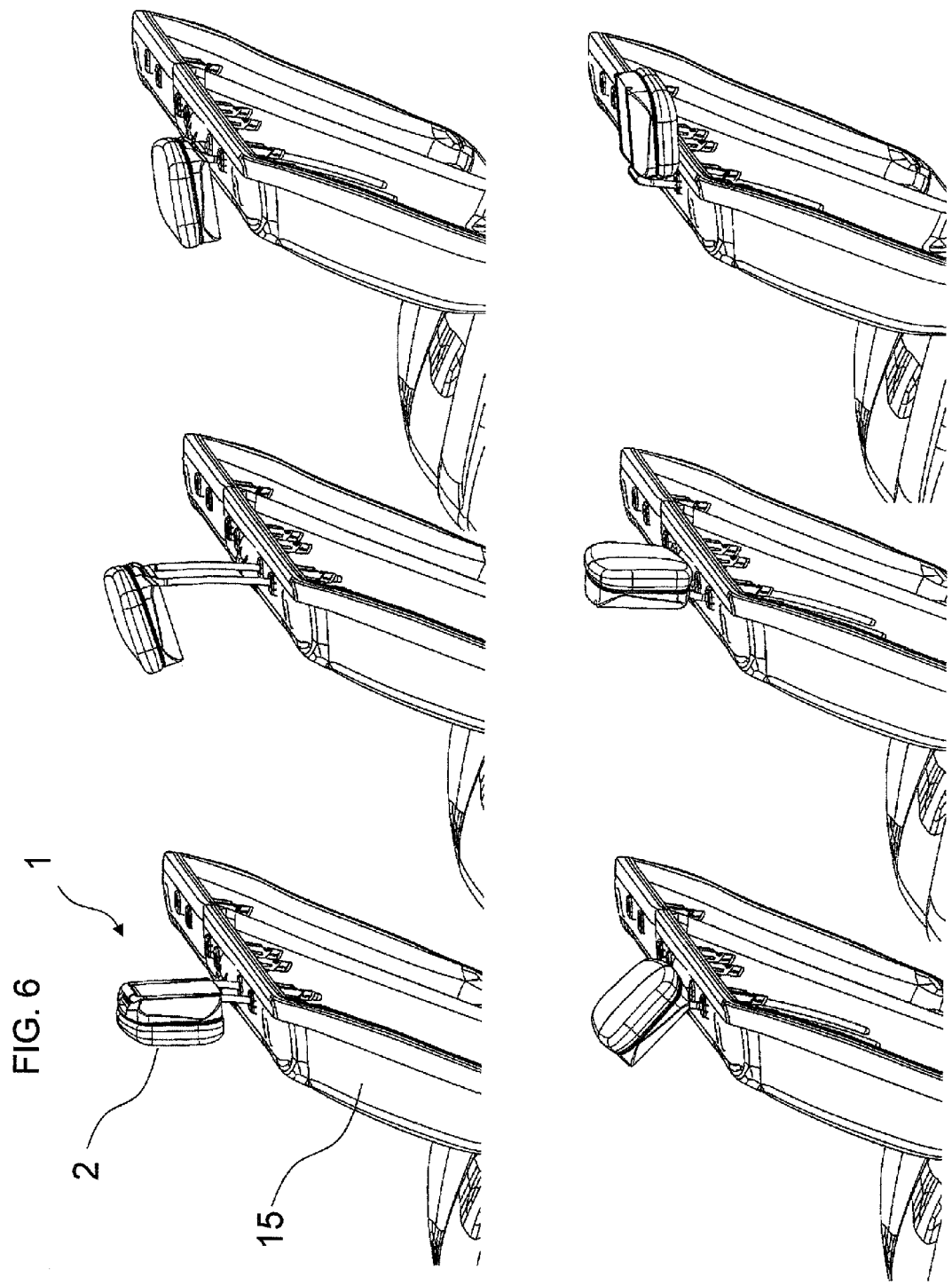

FOLDABLE HEADREST WITH DOUBLE HINGE

CROSS-REFERENCE TO RELATED APPLICATION

This application claims priority to DE 102014216322.6, filed on Aug. 18, 2014, the entire contents of which are hereby incorporated herein by reference.

FIELD OF THE INVENTION

The present invention relates to a headrest for a vehicle seat.

BACKGROUND OF THE INVENTION

It is known in the art that headrests, particularly on rear seats, or headrests attached to a rear bench seat in a motor vehicle can impede the fitting of a child-restraining system, for example a child seat. Insofar as the headrest is not removed for the fitting of the child seat in a case such as this, this can lead to improper use of the child seat in which correct positioning can no longer be guaranteed. In addition, it is generally accepted that headrests on the rear seats can restrict a driver's rear view significantly. For these reasons, headrests have been developed that can be turned down between an in-use position in which the headrest can provide support to the rear of the head of a passenger siting on the vehicle seat and in an out-of-use position in which it is swiveled in a direction in front of or behind a backrest of the vehicle seat, for example. Headrests of this kind known from the state of the art exhibit their own mechanism for this purpose with complex kinematics.

A headrest with a padded part is known from DE 100 38 813 A1, for example, which padded part is secured by means of carrying bars to a backrest of a vehicle seat and is mounted in a hinged manner about a swivel axis to the rear into a flat out-of-use position. The pivot axis is located within the padded part and engages there with guides running substantially parallel to the carrying bars in the padded part. A quite similar design of a headrest that can be turned down is disclosed in FR 2 962 949.

Furthermore, DE 36 15 857 A1 describes a headrest that is secured to a backrest by means of supporting bars that can be displaced in guides. The headrest can be turned down between an in-use position and an out-of-use position in which it does not restrict the view. The supporting bars are each divided by a joint which lies within the associated guide when the headrest is in the in-use position. When the headrest is out of use, it can be pulled out of the guides using the supporting bars until the joints are exposed. A turn-down headrest that is similar in principle is known from DE 197 39 798 A1.

Against this background, the problem addressed by the present invention is that of providing a headrest for a vehicle seat that is comfortable and secure and, in addition, provides a turn-down function between an in-use position and an out-of-use position using simple, effective and inexpensive means. Moreover, the headrest should be easy to operate and universally usable. In addition, a vehicle seat with a headrest is to be provided which likewise benefits from optimized operability and universal usability.

SUMMARY OF THE INVENTION

According to the invention, a headrest for a vehicle seat comprises a padded part, carrying bars for securing the padded part to a backrest of the vehicle seat and a mechanism for turning down the padded part about a swivel axis from an in-use position in which the padded part can provide support to the rear of the head of a passenger sitting on the vehicle seat with its front side into an out-of-use position in which the padded part is swiveled backwards in the direction of a rear side of the backrest of the vehicle seat. The front side of the padded part in this case should be understood to mean the side which is turned towards a front of the vehicle when the headrest is fitted in the vehicle. Correspondingly, the rear side of the padded part or the backrest should be understood to mean the side which is turned towards a rear of the vehicle when it is fitted in the vehicle.

Furthermore, the device for turning down the padded part about the swivel axis comprises a cross member connecting the carrying bars to one another, forming the swivel axis of the padded part, which cross member runs transversely to the longitudinal direction of the carrying bars. According to the present invention, the carrying bars and also the cross members run outside the padded part. The padded part is suspended on the cross member from the outside in a swiveling movable manner.

The embodiment of the headrest according to the invention allows an extremely simple and cost-effective design for realizing the turn-down function of the padded part, as the padded part only has to be suspended from the outside from the cross member in a swiveling movable manner. The overall mechanism of the turn-down device is limited accordingly to the cross member connected to the carrying bars and also the swiveling movable suspension of the padded part. Due to the simple mechanism, the headrest according to the invention is, moreover, extremely easy to operate, as the padded part can be turned down in the simplest manner by swiveling about the cross member of the carrying bars between the in-use position and the out-of-use position. Since the turn-down device of the headrest according to the invention is not attached within the padded part, the padded part may be configured in a manner substantially unrestricted by the swiveling mechanism, so that a comfortable and secure supporting function of the padded part can be guaranteed in its in-use position. In its out-of-use position in which the padded part is swiveled to the rear in the direction of a rear side of the backrest of the vehicle seat, it does not act as an obstacle to the fitting of a child-restraining system, for example a child seat, on the vehicle seat. Moreover, when the headrest is in the out-of-use position, the rear view for a driver of the vehicle is not restricted by the padded part.

An advantageous embodiment of the invention envisages that the carrying bars run along a rear side of the padded part and the padded part rests in its in-use position with its rear side against the carrying bars. In this way, the padded part is reliably positioned in its in-use position, without it requiring a costly locking mechanism for the padded part which, moreover, makes operation of the headrest significantly easier.

According to a further advantageous embodiment of the invention, recesses assigned to the carrying bars are provided on the rear side of the padded part, in which recesses the carrying bars run when the padded part is in the in-use position. The recesses are particularly preferably configured in such a manner that the carrying bars are completely housed therein, something that improves the aesthetic impact of the headrest, as the carrying bars do not project from the contour of the padded part on the rear side thereof.

A further advantageous embodiment of the invention envisages that the recesses display overpressable locking devices for the carrying bars. Consequently, the padded part can be locked and held in its in-use position on the carrying bars. The overpressable locking device can preferably be overcome with relatively little manual force, so that the operability of the headrest is not negatively affected by this. The overpressable locking device may, for example, be realized by a simple reduction in the clear width of the internal diameter of the recess in a certain longitudinal section of said recess. The reduction in the clear width of the recess acts on the carrying bar held therein as a flexible locking device, the elastic force whereof can be overcome manually by the user of the headrest when the carrying bars are inserted into the recess and also when the headrest is removed.

According to a further advantageous embodiment of the invention, the padded part has a supporting bar running parallel to the cross member projecting from the contour of the padded part. A double clip is provided in this case, which is engaged both with the cross member and also with the retaining strut in a swiveling movable manner. The cross member and the retaining strut preferably have a round cross section, so that the double clip which comprises two clip parts rigidly connected to one another likewise with a round cross section, which clip parts can be clamped on the cross member and the retaining strut in a rotationally movable manner, creates the swiveling movable connection between the padded part and the cross member.

According to a further advantageous embodiment, the retaining strut is exposed on the upper side of the padded part, wherein the upper side should be understood to mean that side of the padded part which is turned towards a roof side of the vehicle in the state fitted in the vehicle, when the headrest is located in its in-use position. The arrangement of the retaining strut on the upper side of the padded part means that a greatest possible swivel angle range is achieved for the padded part, as the padded part does not collide during swiveling about a large angle range with the stationary carrying bars.

A still further advantageous embodiment envisages that the padded part can be swiveled about 270°, for example, between the in-use position and the out-of-use position. It is therefore guaranteed that the padded part can be swiveled out of its substantially perpendicular position in the in-use position at least into a substantially horizontal position in the out-of-use position behind the backrest of the vehicle seat.

According to a further aspect, the invention comprises a vehicle seat with a backrest and a headrest arranged thereon, according to one of the previously described embodiments. The facility described above of moving the headrest into an out-of-use position means that an improved construction size of the vehicle seat can be achieved. Particularly in the out-of-use position of the headrest, the vehicle seat displays a more compact embodiment overall, as the vertical extension of the headrest in the out-of-use position is smallest, as a result of which the rear view for a driver of the vehicle is least restricted. Moreover, the swiveling of the headrest into the out-of-use position allows a child-restraining system, a child seat for example, to be securely fitted to the vehicle seat.

An advantageous embodiment of the vehicle seat according to the invention envisages that the carrying bars are housed in the backrest in a longitudinally displaceable manner, in other words the headrest is height-adjustable relative to the backrest. This makes operability during the swiveling of the padded part of the headrest, among other things, easier.

One aspect of the present invention includes a headrest having a padded part that is operable between in-use and out-of-use positions. First and second carrying bars secure the padded part to a backrest of the vehicle seat. A mechanism is coupled to the padded part for turning the padded part about a swivel axis from the in-use position to the out-of-use position. The mechanism includes a cross member connecting the first and second carrying bars to one another and defining the swivel axis of the padded part. The first and second carrying bars and the cross member are disposed outside the padded part in assembly, and the padded part is suspended on the cross member in a swiveling manner.

Another aspect of the present invention includes a vehicle seat having a seatback and a headrest. A support structure includes first and second carrying bars coupled to the seatback at a first end and further coupled to one another by a cross member at a second end. A padded part of the headrest is supported on the support structure by an adjustment mechanism. The adjustment mechanism is configured for moving the padded part between first and second positions relative to the seatback. The padded part includes a front side facing a car-forward direction when the padded part is in the first position. The front side of the padded part faces the seatback when the padded part is in the second position.

Yet another aspect of the present invention includes a padded part supported on a support structure that is coupled to a seatback. An adjustment mechanism is coupled between the padded part and the support structure for pivoting the padded part more than 180° between an in-use position, wherein a front side of the padded part faces a car-forward direction, and a stowed position, wherein the front side faces a downward direction.

These and other aspects, objects, and features of the present invention will be understood and appreciated by those skilled in the art upon studying the following specification, claims, and appended drawings.

It should be pointed out that the features individually listed in the claims can be combined with one another in any technically feasible manner and disclose further embodiments of the invention. The description characterizes and specifies the invention, particularly in connection with the figures in addition.

BRIEF DESCRIPTION OF THE DRAWINGS

Further features and advantages of the invention result from the following description of an exemplary embodiment of the invention to be understood as non-limiting which is explained in greater detail below with reference to the drawing. In this drawing, the figures show schematically:

FIG. 2 is a side perspective view of the headrest of FIG. 1;

FIG. 3 is a side perspective view of the support structure of the headrest of FIG. 1;

FIG. 4 is another side perspective view of the support structure of FIG. 3;

FIG. 6 is a sequence of six operating positions of the headrest of FIG. 1 showing relative movement of the padded part from an in-use position into an out-of use position.

In the different figures, equivalent parts in terms of their function are always provided with the same reference numbers, which means that these are also usually described only once.

DETAILED DESCRIPTION OF THE PREFERRED EMBODIMENTS

Figure 1:
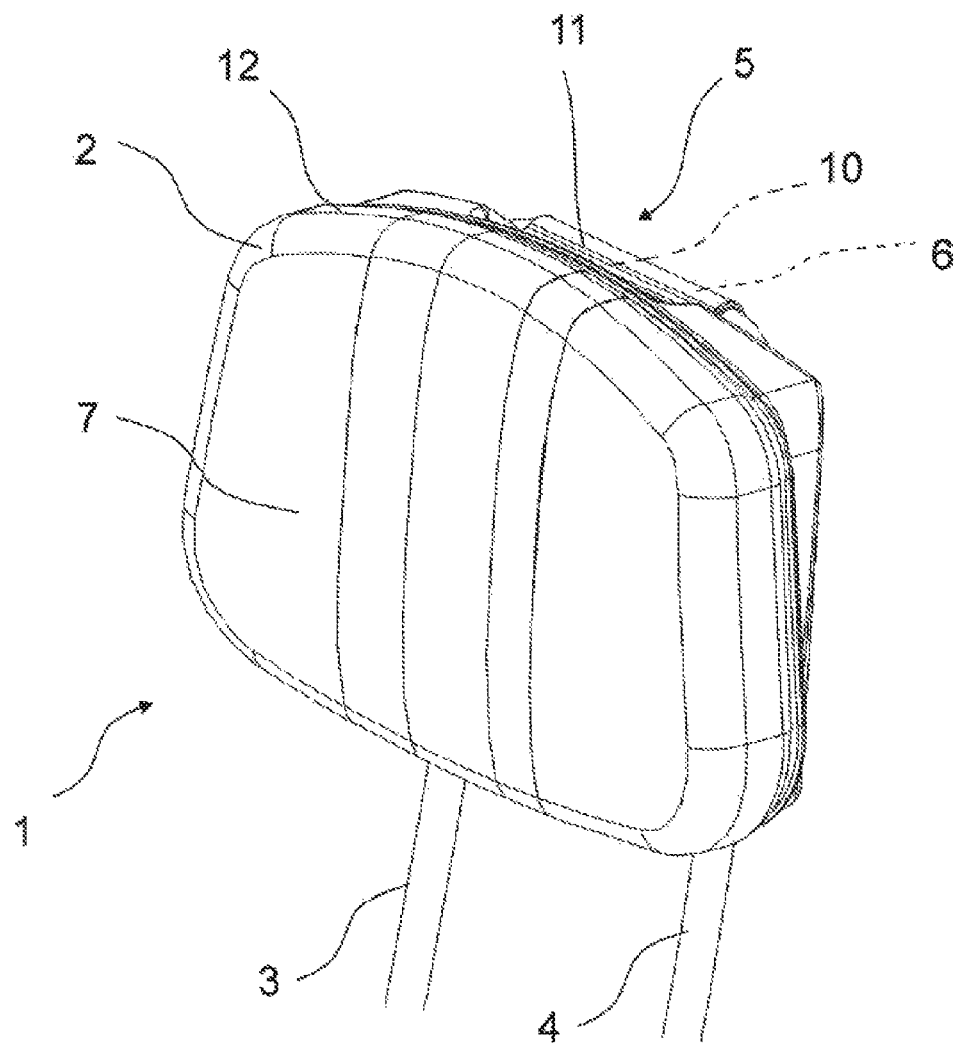
FIG. 1 is a front perspective view of a headrest in an in-use position according to an embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 depicts a perspective front view of an embodiment of a headrest 1 according to the invention for a vehicle seat of a motor vehicle not shown in FIG. 1 in an in-use position. As can be seen in FIG. 1, the headrest 1 comprises a padded part 2 defining a central headrest bun. In addition, first and second carrying bars 3 and 4 are coupled to the padded part 2 for securing the padded part 2 to a backrest of the vehicle seat (not shown in FIG. 1). An adjustment mechanism 5 is coupled to the first and second carrying bars 3, 4 and the padded part 2 for turning down the padded part 2 about a swivel axis 6 from an in-use position (FIG. 1) in which the padded part 2 is able to provide support to the rear of the head of a passenger sitting in the vehicle seat (not shown) with a front side 7, to an out-of-use position (FIG. 6), in which the padded part 2 is swiveled backwards in the direction of a rear side of the backrest of the vehicle seat. As can further be gathered from FIG. 1, the mechanism 5 comprises a cross member 6 connecting the first and second carrying bars 3 and 4 to one another and forming the swivel axis 6 of the padded part 2.

In the case of the exemplary embodiment shown in FIG. 1, the carrying bars 3 and 4 and also the cross member 6 run outside the padded part 2 and the padded part 2 is suspended from the outside by means of the turn-down or adjustment mechanism 5 on the cross member 6 in a swiveling movable manner. This can be seen more clearly in FIG. 2 which depicts a perspective side view of the headrest 1 from FIG. 1. In particular, the first and second carrying bars 3 and 4, in the exemplary embodiment of the headrest 1 shown in FIG. 2, run along a rear side 8 of the padded part 2. In the in-use position of the headrest 1 shown in FIG. 2, the padded part 2 additionally rests with its rear side 8 against the carrying bars 3 and 4.

In addition, it can be seen in FIG. 2 that on the rear side 8 of the padded part 2, first and second recesses 9 are provided in the padded part 2 which are aligned with and assigned to the first and second carrying bars 3 and 4. In the in-use position of the padded part 2 the carrying bars 3 and 4 run in these recesses 9 in each case. In particular, the carrying bars 3 and 4, as can be seen from FIG. 2, are completely housed or received in the respective recesses 9 in the headrest 2 shown in FIG. 1, as a result of which the aesthetic impact of the headrest 1 is improved, as the carrying bars 3 and 4 do not project outside of the contour of the padded part 2 on the rear side 8 thereof.

The recesses 9 preferably have overpressable locking devices (not shown) for the carrying bars 3 and 4. Consequently, the padded part 2 can be locked and held in its in-use position on the carrying bars 3 and 4.

Furthermore, it can be seen from FIGS. 1 and 2 that the padded part 2 of the exemplary embodiment of the headrest 1 shown has a retaining strut 10 running parallel to the cross member 6 projecting from the contour of the padded part 2. The swiveling movable suspension of the padded part 2 on the cross member 6 is created by a double clip 11 which is in swiveling movable engagement both with the cross member 6 and also with the retaining strut 10.

As can be seen in FIGS. 1 and 2, the cross member 6 and the retaining strut 10 of the headrest 1 shown display a round cross section, so that the double clip 11 which comprises two clip parts rigidly connected to one another, likewise with a round cross section, can be clamped in a rotationally movable manner on the cross member 6 and the retaining strut 10. In addition, it can be seen from FIGS. 1 and 2 that the retaining strut 11 of the headrest 1 projects from the upper side 12 of the padded part 2. In this way, the padded part 2 can be swiveled more than 180° between the in-use position and the out-of-use position. As shown in FIG. 6, the padded part 2 swivels about 270° between the in-use position and the out-of-use position.

Figure 5:
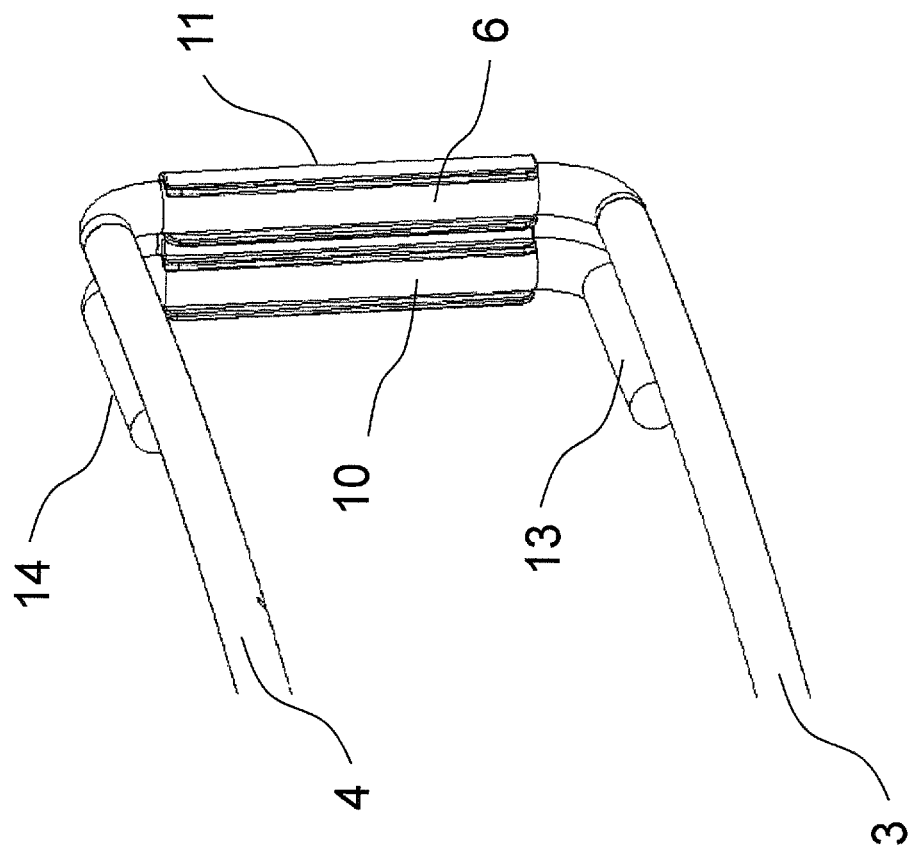
FIG. 5 is a bottom perspective view of the support structure of FIG. 3.

FIGS. 3 and 4 each depict a perspective side view of the headrest 1 from FIG. 1 without the padded part 2. FIG. 5 shows a perspective bottom view of the headrest 1 from FIG. 1 without the padded part 2. In FIGS. 3, 4 and 5 the carrying bars 3 and 4, the cross member 6 connecting these to one another at an upper end of the carrying bars 3 and 4, the retaining strut 10 and also the double clip 11 connecting the retaining strut 10 to the cross member 6 can be seen more clearly, and collectively define a support structure for the headrest 1. The carrying bars 3 and 4 form a U-shape along with the cross member 6. In a similar manner, the retaining strut 10 is connected to two supporting bars 13 and 14 which together form a U-shape. The supporting bars 13 and 14 are inserted in the padded part 2 of the headrest 1 shown in FIGS. 1 and 2 for securing the retaining strut 10 to the padded part 2, so that only the retaining strut 10 projects from the upper side 12 of the padded part 2.

In the bottom view shown in FIG. 5, it can be seen that the two clip parts of the double clip 11 are open at the bottom, so that they can thereby easily be clamped onto the retaining strut 10 and also the cross member 6.

FIG. 6 depicts from top left to bottom right a sequence of six operating positions of the headrest 1 from FIG. 1 during the swiveling of the padded part 2 from the in-use position into an out-of-use position on a seatback or backrest 15 of a vehicle seat. In the operating position shown on the left in the top row in FIG. 6, the headrest 1 is located in its in-use position. In the operating position shown on the right in the bottom row in FIG. 6, the headrest 1 is located in its out-of-use or stowed position. For this purpose, the headrest, as shown in FIG. 6, is swiveled or pivoted through roughly 270°, for example, about the swivel axis 6 formed by the cross member 6 and also about the swivel axis 10 formed by the retaining strut 10. As can be further seen in FIG. 6, the carrying bars 3 and 4 are housed in a longitudinally displaceable manner in the backrest 15, so that the headrest 1 is height-adjustable relative to the backrest 15. In particular, the swiveling of the padded part 2 of the headrest 1 is preferably carried out in its lower position adjacent to the upper side of the backrest 15, as can be seen from the representation in FIG. 6 in the top row right and the bottom row left and center, so that the turning-down of the padded part 2 is not impeded by the vehicle roof, for example.

The headrest according to the invention and the vehicle seat according to the invention have been explained in greater detail with the help of an exemplary embodiment shown in the figures. The headrest and the vehicle seat are not, however, limited to the embodiment described herein, but also comprise further embodiments having the same effect.

In a preferred embodiment, the headrest according to the invention is used in a vehicle, particularly a motor vehicle, wherein the headrest is arranged on a backrest of a vehicle seat fitted in the vehicle.

In a preferred embodiment, the headrest according to the invention is used in a vehicle, particularly a motor vehicle, wherein the headrest is arranged on a backrest of a vehicle seat fitted in the vehicle.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A headrest for a vehicle seat, comprising:
   a padded part operable between in-use and out-of-use positions;
   first and second carrying bars securing the padded part to a backrest of said vehicle seat;
   a mechanism for turning the padded part about a swivel axis from the in-use position to the out-of-use position, the mechanism including a cross member connecting the first and second carrying bars to one another and defining the swivel axis of the padded part, wherein the first and second carrying bars and the cross member are disposed outside the padded part, and further wherein the padded part is suspended on the cross member in a swiveling manner, and further wherein the first and second carrying bars are disposed along a rear side of the padded part, and further wherein the padded part rests with the rear side against the first and second carrying bars when the padded part is in the in-use position;
   a retaining strut coupled to the padded part and running substantially parallel to the cross member; and
   a double clip coupled to the cross member and further coupled to the retaining strut in a swiveling movable manner.

2. The headrest as claimed in claim 1, including:
   first and second recesses disposed on the rear side of the padded part, wherein the first and second recesses align with the first and second carrying bars, and further wherein the first and second carrying bars are received in the first and second recesses, respectively, when the padded part is in the in-use position.

3. The headrest as claimed in claim 1, wherein a portion of the retaining strut is disposed along an upper side of the padded part.

4. The headrest claimed in claim 1, wherein the padded part is configured to swivel 270° in moving between the in-use position and the out-of-use position.

5. The headrest claimed in claim 1, wherein the first and second carrying bars are partially received in the backrest in a longitudinally displaceable manner.

6. A vehicle seat, comprising:
   a seatback;
   a support structure having first and second carrying bars coupled to the seatback at a first end and further coupled to one another by a cross member at a second end;
   a padded part supported on the support structure at an upper portion of a rear side of the padded part by an adjustment mechanism for moving the padded part between first and second positions;
   wherein the padded part includes a front side facing a car-forward direction when the padded part is in the first position, and further wherein the front side of the padded part faces the seatback when the padded part is in the second position;
   a retaining strut coupled to the padded part and running substantially parallel to the cross member; and a double clip coupled to the cross member and further coupled to the retaining strut in a swiveling movable manner.

7. The vehicle seat of claim 6, including:
first and second recesses disposed on the rear side of the padded part and configured to at least partially receive the first and second carrying bars, respectively, when the padded part is in the first position.

8. The vehicle seat claimed in claim 6, wherein the padded part is configured to be swiveled more than 180° when moving from the first position to the second position.

9. The vehicle seat claimed in claim 8, wherein the padded part is configured to swivel 270° when moving from the first position to the second position.

10. The vehicle seat claimed in claim 6, wherein the first and second carrying bars are partially received in the seatback in a longitudinally displaceable manner.

11. The vehicle seat claimed in claim 6, wherein the first position of the padded part defines an in-use position, and further wherein the second position of the padded part defines a stowed position.

12. A vehicle seat, comprising:
a padded part supported on a cross member of a support structure coupled to a seatback;
a retaining strut coupled to the padded part and running substantially parallel to the cross member; and
a double clip coupled between the padded part and the support structure for pivoting the padded part more than 180° between an in-use position, wherein a front side of the padded part faces a car-forward direction, and a stowed position, wherein the front side faces a downward direction.

13. The vehicle seat claimed in claim 12, wherein the double clip is pivotally coupled to both the retaining strut and the cross member.

14. The vehicle seat claimed in claim 12, wherein the support structure includes first and second carrying bars coupled to the seatback at a first end and further coupled to one another by the cross member at a second end.

15. The vehicle seat claimed in claim 14, including:
first and second recesses disposed on a rear side of the padded part and configured to at least partially receive the first and second carrying bars, respectively, when the padded part is in the first position.

* * * * *